US006985601B2

(12) United States Patent
Wendt

(10) Patent No.: US 6,985,601 B2
(45) Date of Patent: Jan. 10, 2006

(54) WATERMARK RESISTANT TO ROTATION AND RESIZING

(75) Inventor: Peter David Wendt, Mahwah, NJ (US)

(73) Assignees: Sony Corporation, (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 10/890,531

(22) Filed: Jul. 13, 2004

(65) Prior Publication Data
US 2005/0008191 A1 Jan. 13, 2005

Related U.S. Application Data

(63) Continuation of application No. 09/758,712, filed on Jan. 11, 2001, now Pat. No. 6,845,170.

(51) Int. Cl.
*G06K 9/00* (2006.01)
(52) U.S. Cl. .................... 382/100; 382/243; 380/200
(58) Field of Classification Search ............... 382/100, 382/107, 108, 151, 153, 123, 162, 165, 166, 382/170, 174–178, 182, 184, 203, 232, 233–250, 382/254, 266, 277–287, 296, 297; 345/530, 345/700; 348/177, 356, 398.1, 460; 428/13; 713/150; 380/54, 200, 239, 258; 375/240, 375/242; 356/601, 138
See application file for complete search history.

(56) References Cited

U.S. PATENT DOCUMENTS

| 4,313,984 A | * | 2/1982 | Moraw et al. ............. 428/13 |
| 5,084,790 A | | 1/1992 | Endoh |
| 5,144,658 A | | 9/1992 | Takahashi |
| 5,809,139 A | | 9/1998 | Girod et al. |
| 5,915,027 A | * | 6/1999 | Cox et al. ................ 380/54 |
| 5,930,369 A | | 7/1999 | Cox et al. |
| 6,047,374 A | * | 4/2000 | Barton ..................... 713/150 |
| 6,108,434 A | * | 8/2000 | Cox et al. ................. 382/100 |
| 6,141,441 A | * | 10/2000 | Cass et al. ................ 382/166 |
| 6,282,299 B1 | | 8/2001 | Tewfik et al. |
| 6,282,300 B1 | * | 8/2001 | Bloom et al. ............. 382/100 |
| 6,381,341 B1 | | 4/2002 | Rhoads |
| 6,404,926 B1 | | 6/2002 | Miyahara et al. |
| 6,424,725 B1 | | 7/2002 | Rhoads et al. |
| 6,442,283 B1 | | 8/2002 | Tewfik et al. |
| 6,463,162 B1 | | 10/2002 | Vora |
| 6,556,689 B1 | | 4/2003 | Xia et al. |
| 6,563,937 B1 | | 5/2003 | Wendt |
| 6,567,533 B1 | | 5/2003 | Rhoads |
| 6,680,972 B1 | | 1/2004 | Liljeryd et al. |
| 2001/0036292 A1 | | 11/2001 | Levy et al. |
| 2002/0090107 A1 | | 7/2002 | Acharya et al. |
| 2003/0012402 A1 | | 1/2003 | Ono |
| 2003/0021439 A1 | | 1/2003 | Lubin et al. |
| 2003/0215112 A1 | | 11/2003 | Rhoads et al. |

FOREIGN PATENT DOCUMENTS

| EP | 0778566 | 6/1997 |
| JP | 2001-078010 A | 3/2001 |
| WO | WO 97/26733 | 7/1997 |

OTHER PUBLICATIONS

Pereira, S., et al., "Robust Template Matching For Affine Resistant Image Watermarks" IEEE Article, pp. 1123-1129, 2000.*

(Continued)

*Primary Examiner*—Daniel Miriam
*Assistant Examiner*—Seyed Azarian
(74) *Attorney, Agent, or Firm*—Lerner, David, Littenberg, Krumholz & Mentlik, LLP

(57) ABSTRACT

A hidden watermark and methods of detecting and embedding such watermark is provided. The watermark is resistant to efforts to avoid the message thereof.

24 Claims, 3 Drawing Sheets

OTHER PUBLICATIONS

Linnartz, J., et al., "Detecting Electronic Watermarks In Digital Video," Philips Researchpp. 1-4.*

Solachidis, et al., "Circularly Symmetric Watermark Embedding in 2-D DFT Domain," IEEE Article, pp. 3469-3472, 1999.

Licks, V., et al., "On Digital Image Watermarking Robust To Geometric Transformations," IEEE Article, pp. 690-693, 2000.

Ni, Z., et al., "Enhancing Robustness of Digital Watermarking against Geometric Attack Based on Fractal Transform," IEEE Article, pp. 1033-1036, 2000.

Alghoniemy, M., et al., "Image Watermarking By Moment Invariants," IEEE Article, pp. 73-76, 2000.

Tefas, A., et al., "Multi-Bit Image Watermarking Robust To Geometric Distortions," IEEE Article, pp.710-713, 2000.

Termont, P., et al., "How To Achieve Robustness Against Scaling In A Real-Time Digital Watermarking System For Broadcsat Monitoring," IEEE Article, pp. 407-410, 2000.

Hong, M., et al., "A Private/Public Key Watermarking Technique Robust To Spatial Scaling," IEEE Article, pp. 102-103, 1999.

Chotikakamthorn, N., et al., "Ring-shaped Digital Watermark for Rotated and Scaled Images Using Random-Phase Sinusoidal Function," IEEE Article, pp. 321-325, 2001.

O Ruanaidh, J., et al., "Rotation, Scale and Translation Invariant Digital Image Watermarking," IEEE Article, pp. 536-539, 1997.

Lin, C., et al., "Rotation, Scale, and Translation Resilient Watermarking for Images," IEEE Article, pp. 767-782, 2001.

Tsekeridou, S., et al., "Copyright Protection of Still Images Using Self-Similar Chaotic Watermarks," IEEE Article, pp 411-414, 2000.

Lu, C., et al., "Video Object-Based Watermarking: A Rotation and Flipping Resilient Scheme," IEEE Article, pp. 483-486, 2001.

Pereira, S., et al., "Template Based Recovery of Fourier-Based Watermarks Using Log-polar and Log-log Maps," IEEE Article, pp. 870-874, 1999.

Pereira, S., et al., "Transform for Digital Image Watermarking".

Tsekeridou, S., et al., "Wavelet-Based Self-Similar Watermarking For Still Image," IEEE Article, pp. I-220-I-223, 2000.

Mora-Jimenez, I., et al., "A New Spread Spectrum Watermarking Method With Self-Synchronization Capabilties," IEEE Article, pp. 415-418, 2000.

Pereira, S., et al., "Robust Template Matching for Affine Resistant Image Watermarks," IEEE Article, pp. 1123-1129, 2000.

Martin Kutter, "Towards Affine Invariant Image Watermarking Schemes," Swiss Federal Institute of Technology, Lausanne, pp. 1-27.

Caldelli, R., et al., "Geometric-Invariant Robust Watermarking Through Constellation Matching In The Frequency Doman," IEEE Article, pp. 65-68, 2000.

Burak Ozer, I., et al., "A New Method For Detection Of Watermarks In Geometrically Distorted Images," IEEE Article, pp. 1963-1966, 2000.

Delannay, D., et al., "Generalized 2-D Cyclic Patterns For Secret Watermark Generation," IEEE Article, pp. 77-79, 2000.

Hel-Or, H.Z., et al., "Geometric Hashing Techniques For Watermarking," IEEE Article, pp. 498-501, 2001.

Voloshynovskiy, S., et al., "Multibit Digital Watermarking Robust Against Local Nonlinear Geometrical Distortions," IEEE Article, pp. 999-1002, 2001.

Anderson, R., et al., "Information Hiding An Annotated Bibliography," Computer Laboratory, University of Cambridge, pp. 1-62.

Kutter, M., et al., "Towards Second Generation Watermarking Schemes," IEEE Article, pp. 320-323, 1999.

Kaewkamnerd, N., et al., "Wavelet Based Watermarking Detection Using Multiresolution Image Registration," IEEE Article, pp. II-171-II-175, 2000.

Termont, P., et al., "Performance Measurements of a Real-time Digital Watermarking System for Broadcast Monitoring," IEEE Article, pp. 220-224, 1999.

Maes, M., et al., "Exploiting Shift Invariance to Obtain a High Payload in Digital Image Watermarking," IEEE Article, pp. 7-12, 1999.

Linnartz, J., et al., "Detecting Electronic Watermarks In Digital Video," Philips Researchpp. 1-4.

Petitcolas, F., et al., "Information Hiding —A Survey," IEEE Article, pp. 1062-1078, 1999.

Kutter, M., "Watermarking Resisting to Translation, Rotation, and Scaling," Signal Processing Laboratory, Swiss Federal Institute of Technology.

Braudaway et al., "Automatic recovery of invisible image watermarks from geometrically distorted images," Proc. SPIE vol. 3971: Security and Watermarking of Multimedia Contents II, Jan. 2000, pp. 74-81.

Alghoniemy et al., "Geometric Distortion Correction Through Image Normalization," Proc. IEEE Int. Conf. on Multimedia and Expo 2000, vol. 3, Jul./Aug. 2000 pp. 1291-1294.

Kusanagi et al., "An Image Correction Scheme for Video Watermarking Extraction," IEICE Trans. Fundamentals, vol. E84-A, No. 1, Jan. 2001, pp. 273-280.

Delannay et al., "Compensation of Geometrical Deformations for Watermark Extraction in the Digital Cinema Application," Proc. SPIE vol. 4314: Security and Watermarking of Multimedia Contents III, Jan. 2001, pp. 149-157.

Su et al., "Synchronized Detection of the Black-based Watermark with Invisible Grid Embedding," Proc. SPIE vol. 4314: Security and Watermarking of Multimedia Contents III, Jan. 2001, pp. 406-417.

Loo et al., "Motion estimation based registration of geometrically distorted images of watermark recovery," Proc. SPIE vol. 4314: Security and Watermarking of Multimedia Contents III, Jan. 2001, pp. 606-617.

Su et al., "A Content Depending Spatially Localized Video Watermark for Resistance to Collusion and Interpolation Attacks," IEEE Proc. Int. Conf. on Image Processing, vol. 1, Oct. 2001, pp. 818-821.

Cox, et al., "Secure Spread Spectrum Watermarking for Multimedia," NEC Research Institute Technical Reports, 1995, pp. 1-33.

Berghel, et al., "Protecting ownership rights through digital watermarking," Internet Kiosk, XP 000613936, Jul. 1996, pp. 101-103.

* cited by examiner

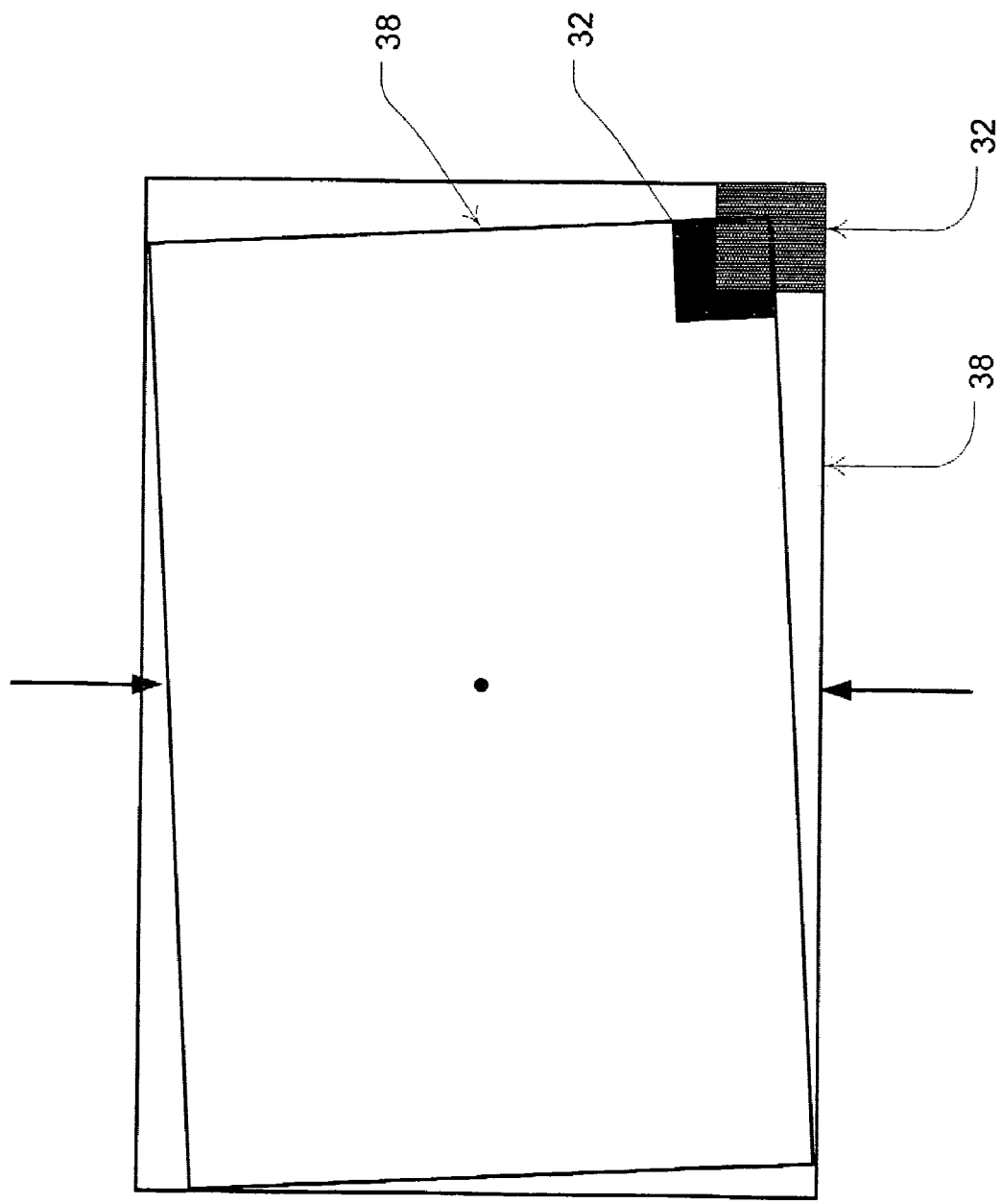

WATERMARK RESISTANT TO ROTATION AND RESIZING

CROSS-REFERENCE TO RELATED APPLICATIONS

This is a continuation of U.S. patent application Ser. No. 09/758,712 filed on Jan. 11, 2001 now U.S. Pat. No. 6,845,170.

BACKGROUND OF THE INVENTION

This invention relates to watermarks that form part of the content on computer readable memory media. More particularly, this invention relates to memory media having watermarks and methods of creating and detecting such watermarks.

It is of great concern to the music, video, software and publishing industries to be able to prevent and track improper copying of content from computer readable memory media (e.g., digital video disks (DVDs), compact disks (CDs), read only memory (ROM), random access memory (RAM), various magnetic media and other memory media). This concern has been addressed, in part, by the use of "watermarks," which are hidden messages arranged on a memory medium along with other data, such as video data, audio data, various software applications, etc.

For example, watermarks have been used on optical memory media, such as CD-ROMs and DVDs to prevent the undesired copying of music, movies and software. Notwithstanding such efforts, commercial pirates have used professional editing equipment to erase, obfuscate or otherwise bypass watermarks so that the desired content can be copied from the media on which the content is stored.

One way that pirates have bypassed existing watermark protection systems with optical media having digital data embedded thereon, such as CD-ROMs and DVDs, is through the use of editing and copying equipment that geometrically modifies the configuration (e.g., orientation, shape or size) of the digital content including the watermark in such a way as to render the watermark unreadable. Such geometric modification has been accomplished in many different ways including rotation, resizing, cropping, warping, mirroring, etc.

More specifically, with respect to digital video data embedded on a DVD or the like, the data is arranged in numerous consecutive video frames. Prior art watermarks that carried a "do not copy" message were arranged in one or more of the video frames to prevent unauthorized and undesired copying. However, consumer and professional playback, editing and copying equipment can be used to rotate and resize of the video data. The resizing factor and the rotation angle can vary over continuous ranges.

In the case where editing equipment is used to slightly rotate or resize the video data, the watermark in each frame is similarly rotated or resized. A data detector, such as a standard correlation detector or matched filter, has been used to detect the presence of any watermark pattern in each frame of video data. When the frames are rotated or resized, even a very small amount, the correlation detector often cannot properly detect the presence of a pattern within the watermark and thus the content, of the watermark message cannot be read. This occurs because prior art correlation detectors are particularly dependent upon specific registration of the digital data patterns of the watermark within each video frame. Thus, a slight modification of the resizing factor or rotation angle, can cause the failure of a correlation detector to detect the pattern and thus, the specific "do not copy" message of the watermark. The content on the DVD or other optical memory media could then be copied.

Attempts have been made to create robust watermarks that are resistant to efforts by pirates to overcome such watermarks and copy the accompanying data. Some of these attempts involve the use of log-polar coordinates and Fourier and Mellin transforms for image processing and registration. Data can be converted from normal Cartesian coordinates to log-polar coordinates through a known algorithm, which typically requires coordinate transformation from normal Cartesian coordinates (x, y) to polar coordinates (R, θ) and then to log-polar coordinates (L, θ) by taking the log of the radius after the coordinates have been converted from Cartesian to polar.

Unfortunately, these existing watermarking systems have various drawbacks. First, they require that the watermark be embedded in a particular transform domain for it to be resistant to geometric transformations. This limits the flexibility in the design of the watermark, and so these techniques cannot be incorporated into a previously designed watermarking system to improve it.

Second, these watermarking systems have been criticized for being robust to geometric transformations, but not to other attacks such as noise addition. The technical reason is that these systems obtain geometric robustness by embedding the watermark in the magnitude of a Fourier transform. This transform magnitude is invariant to spatial shifts in the input to the transform, but it is easy to modify and attack. On the other hand, it is well known in image processing that the phase of the Fourier transform of an image contains most of the information in the image. It is possible to completely change the magnitude of the transform, inverse transform the magnitude and phase, and still see much of the content of the original image.

Other approaches embed simple patterns, or complete watermarks, at known positions in images or video frames, and then detect these patterns or watermarks and their positions to compute and account for any rotation, resizing, or other geometric alteration. A system that uses these approaches may not require any frequency transforms or log-polar mappings. Thus, the general idea appears attractive. Also, helper patterns or watermarks can be added to a pre-existing watermark, as long as they do not interfere. In this way, geometric robustness can be added to a pre-existing watermark system.

Unfortunately, such approaches also have drawbacks. For example, there is a tradeoff between robustness and ease of detection of the helper patterns or watermarks. A simple helper pattern may be easy to detect even after it has been geometrically altered—this makes geometric robustness for the main watermark easy to attain, but also makes the helper pattern easy to find and attack. Then, the robustness of the main watermark to geometric manipulations is defeated. On the other hand, the helper patterns may actually be watermarks, which are harder to remove, but also much harder to detect. If the helper watermarks are arbitrary, exhaustive searches may be required over some geometric parameters (such as the angle of rotation). In a sense, such systems merely shift the problem of robustness from the parent watermark to the helper patterns or watermarks.

The present invention overcomes the drawbacks of the foregoing watermark systems by providing a watermark that is resistant to efforts by pirates to avoid "do not copy," or other messages, of hidden watermarks through techniques such as rotation, resizing or other modification efforts of the protected content.

SUMMARY OF THE INVENTION

In accordance with a first aspect of the present invention, computer readable memory medium is provided. The memory medium may be an optical medium, magnetic medium, ROM, RAM or any other computer readable storage device. The memory medium comprises video or audio data arranged in a plurality of frames, and a hidden digital watermark arranged in at least one of the plurality of frames. The hidden watermark includes a first preselected pattern of data and a second preselected pattern of data arranged within at least one of the frames. The first preselected pattern includes information indicative of the geometric orientation of the second preselected pattern and the video or audio data within the frames. The second preselected pattern includes information indicative of a desired message. The first and second preselected patterns are substantially hidden when the video or audio data is displayed or played on an associated display screen or player.

Preferably, the first preselected pattern of data is arranged at a central portion of the at least one frame on the computer readable memory medium. It is also preferable for the second preselected pattern of data to be arranged on the same frame or frames as the first preselected pattern of data. The second preselected pattern of data is preferably arranged at portions other than the central portion of the at least one frame.

In a preferred embodiment, the computer readable memory medium comprises an optical medium. The optical medium may comprise a DVD, a CD-ROM, or any other storage device that can be optically read by an associated computer or other detecting device.

It should be understood that as used herein, the term "geometric configuration" is intended to cover information of a certain orientation, shape and/or size. The "geometric configuration" may relate only to one of the specific orientation, shape or size of data and associated information. Alternatively, the "geometric configuration" may relate to the combination of orientation, shape and size of data and associated information.

As used herein, the term "video or audio data" is intended to cover all types of data content including still image data, true video data such as that used in movies, other types of graphics data, sound data, text data, etc.

The first preselected pattern of data may comprise reference size information, whereby an associated watermark detecting device can detect the actual size of the first preselected pattern of data and can thereafter determine a resizing factor based upon any deviation between the actual and reference sizes thereof. The second preselected pattern of data is preferably arranged within frames on the memory medium at portions other than the central portions thereof where the first preselected pattern is arranged.

Preferably, the first and second preselected patterns of data comprise digital data. The digital data of the first and second preselected patterns may be arranged within frames on the memory medium along with video and audio data.

The desired message of the second preselected pattern of data may comprise a "do not copy" message. Additional or other messages may also be provided by the second preselected pattern of data.

It is preferable for the hidden digital watermark to be arranged in a plurality of successive video frames. In this regard, a complete "do not copy" message may be transmitted over "n" consecutive video frames, and the message of the hidden digital watermark may repeat every "n" frames.

It is preferable for the first preselected pattern of data to comprise a design suitable to be converted to log-polar coordinates that will convey information to an associated correlation detector about the orientation and/or relative size of the second preselected pattern of data.

In accordance with a second aspect of the present invention, a method of detecting a hidden digital watermark message embedded on a computer readable memory medium is provided. The hidden digital watermark message preferably comprises first and second patterns of digital data embedded along with video or audio data within at least one video frame of the memory medium. The method comprises the steps of detecting the first preselected pattern of data; determining the geometric configuration of the first preselected pattern of data; comparing the actual geometric configuration of the first preselected pattern of data with reference geometric configuration information thereof stored in memory associated with a watermark detector; calculating any deviation between the actual geometric configuration of the first preselected pattern of data and the reference geometric configuration information thereof; and utilizing any calculated deviation between the actual and reference geometric configurations of the first preselected pattern of data to detect a second preselected pattern of data.

It is preferable for the actual and reference geometric configuration information to relate to the relative position and size of the second preselected pattern of data and the video or audio data within the same frames.

It is also preferable for the first preselected pattern of data to be arranged at a central portion of the frames. The second preselected pattern of data may be arranged within the same frames as the first preselected pattern of data at portions other than the central portion thereof. In this preferred embodiment, the step of detecting the first preselected pattern of data comprises locating the central portion of the frame containing the data.

The message of the second preselected pattern is preferably a "do not copy." The information conveyed by the first preselected pattern of data preferably relates to at least one of the orientation and relative size of the second preselected pattern of data.

The reference geometric configuration information may comprise stored log-polar coordinate information. If such information is present, the method of detecting a hidden watermark message may comprise the steps of (1) converting data corresponding to the actual geometric configuration of the first preselected pattern of data into log-polar coordinates, and (2) comparing any deviation in the log-polar coordinates of the actual and reference geometric configuration information to determine a rotation angle or resizing factor, whereby (3) the rotation angle or resizing factor is utilized to detect the desired message of the second predetermined pattern of data.

In a preferred embodiment where the computer readable memory medium comprises an optical medium, all data thereon may comprise digital data. The steps of the method of detecting a hidden watermark may comprise optically detecting all data on the optical medium.

In yet another aspect of the present invention, a method of creating a hidden watermark message within video or audio data on a computer readable memory medium is provided. The method comprises the steps of embedding a first preselected pattern of data within at lease one frame of data on the memory medium; and embedding a second preselected pattern of data within the at least one frame of data. The first preselected pattern preferably includes information indicative of the geometric configuration of said second preselected pattern of data and said video or audio data. The second preselected pattern of data preferably includes information indicative of a desired message. The first and second preselected patterns are preferably substantially hidden when the video or audio data is displayed or played.

Preferably, the first preselected pattern of data is embedded on the memory medium at a central portion of the at least one frame. The computer readable memory medium may comprise an optical medium such as a DVD, CD-ROM or other optical medium. However, any computer readable memory medium may be used in accordance with this aspect of the present invention.

In the preferred embodiment where the first preselected pattern of data is embedded at a central portion of the at least one frame, it is preferable for the second preselected pattern of data to be embedded within the same frames at portions other than the central portion thereof.

The desired message of the second preselected pattern of data is preferably a do not copy message. However, an infinite variety of messages may be provided in alternate embodiments.

It is preferable for the first preselected pattern of data to comprise a design that can be converted into log-polar coordinates. The geometric configuration information carried by the first preselected pattern of data preferably comprises at least one of position and size information. In this embodiment, an associated watermark detection device can determine at least one of the actual position and size of the first preselected pattern of data and compare such actual position and size with reference to position and size information stored in memory. The deviation between the actual and reference position and size information is then calculated, and is used to determine at least one of a resizing and rotation factor, which in turn is used to detect the desired message of the second preselected pattern of data.

The foregoing features of the present invention may be further appreciated with reference to the following description of the preferred embodiment and accompanying drawings.

BRIEF DESCRIPTION OF THE DRAWINGS

FIG. 3 is a schematic illustration of the frame of data of FIG. 2 showing the watermark before and after being rotated.

DETAILED DESCRIPTION OF THE PREFERRED EMBODIMENT

Figure 1:
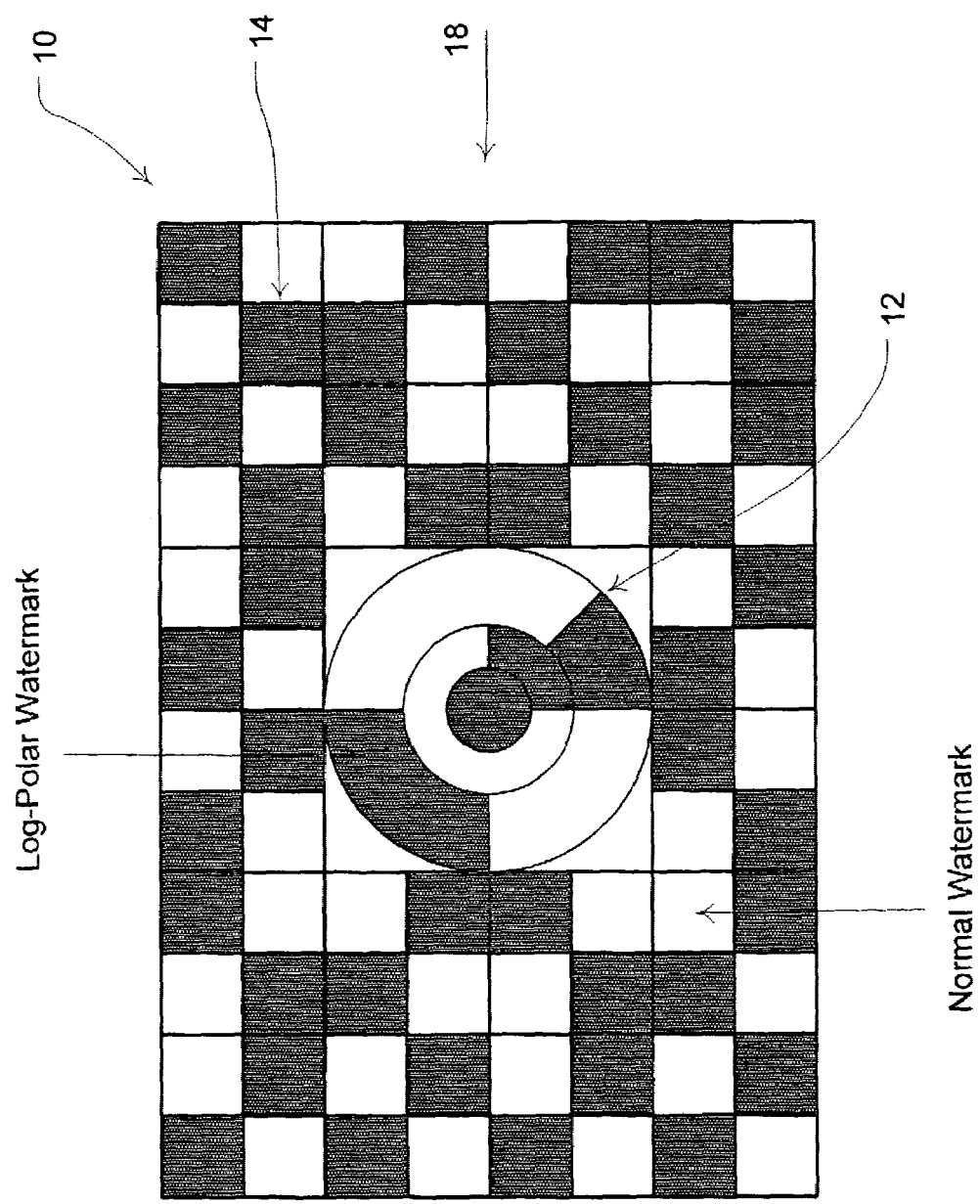
FIG. 1 is a schematic illustration of the watermark of the present invention.

The watermark of the present invention may be displayed in any of an infinite variety of designs. A preferred watermark system may use a checkerboard design, such as that developed by Sony Corporation of Tokyo, Japan.

The watermark carries a hidden message embedded in each frame or selected frames of data on a computer readable memory medium. Although this preferred embodiment will be described in the context of a digital watermark embedded in frames of video data on an optical medium, such as a DVD, it should be appreciated that the present invention applies to all computer readable memory media, and is not limited to digital data or any particular type of video or audio data.

In the preexisting preferred Sony watermark system, there are numerous different checkerboard patterns that can convey many different messages. Each black and white square of the checkerboard watermark corresponds to a digital 1 or 0. The message may be disbursed over a series of frames, as opposed to being placed in its entirety in a single frame. When the watermark is used to provide a "do not copy" message for a movie, it may be placed in one or all of the frames of video data. The entire movie includes numerous successive frames. The "do not copy" message may be transmitted and repeated every "n" frames throughout a series of "n" checkerboard patterns. Each video frame may include a portion of the watermark. Thus, while the checkerboard pattern of the watermark system may vary from frame to frame, the "family" of the checkerboard pattern will remain the same throughout a certain number of successive video frames.

The present invention relates to a watermark that is immune to various geometric alterations such as rotation and resizing. In other words, a correlation kernel, or the like, of the watermark will be detected by a correlation detector, or the like, of an editing, copying or playing machine (hereinafter collectively a "player") despite any effort to rotate, resize or otherwise alter the geometric configuration of the watermark. The hidden message of the watermark could then be read and processed. In the context of DVDs, an associated DVD player will be able to read the copy control message of the watermark regardless of a pirate's efforts to rotate or resize the video frames.

The heart of the invention relates to a watermark that comprises two portions. The first portion includes a first preselected pattern of data and a second portion includes a second preselected pattern of data. At least part of the first portion of data is placed in the center of each frame. However, this portion of the watermark includes bits of data or other information arranged in a pattern that is asymmetrical with respect to the center of the frame. The centrally arranged watermark pattern (i.e., the first preselected pattern) is used to provide information about the geometric configuration, such as the orientation and/or size of the second portion of the watermark and the video data within the video frame. It comprises a pattern that cannot be mapped onto itself under any nontrivial combination of rotation and resizing. This means that any combination of rotation and resizing of the centrally arranged watermark pattern (i.e., the first pre-selected pattern) will produce a unique variation of the pattern, from which the rotation angle and resizing factor can be computed. Also, this centrally located pattern carries no copy control message, and is independent of the second pre-selected pattern. Because of these properties, only a single centrally located pattern need be used to allow a processor of an associated player to perform both the rotation and resizing calculations as described below.

The second portion of the watermark pattern includes a copy control message, or other desired message. The second portion may be repetitively placed around the rest of each video frame, (i.e., in all portions of the video frame excluding the central portion). Thus, the present invention relates to a watermark having the following two parts in each frame of video or audio data:

1. A central portion—used to convey a message regarding the geometric configuration of the hidden message of the second portion of the watermark; and
2. A second portion arranged in the same video frame as the central portion—used to convey the copy control message or other message.

A schematic illustration of a watermark in accordance with the present invention is shown in FIG. 1. The watermark 10 includes a first portion 12 having a generally circular configuration with a first preselected pattern of data. The watermark 10 also includes a second portion 14 having a second preselected pattern of data in the form of a checkerboard. The watermark 10 is placed within a frame 18 of video or audio data on an associated optical medium, such as a DVD (not shown).

In a preferred embodiment, the message carried by the pattern of the second portion 14 of the watermark 10 is a "do not copy" message. However, it should be understood that an infinite variety of messages could be carried by the second portion 14 to be detected and read by an associated correlation detector and reader of a player.

As shown in FIG. 1, the first portion 12 of the watermark 10 includes a pattern, which is not completely symmetrical. The first portion 12 is arranged in the center of a video frame. Although the particular video data that is arranged within the video frame 18 to be displayed on the associated display screen is not shown in the drawings, it should be understood that the watermark 10 is preferably superimposed on various portions of the video image in such a way as to be substantially hidden from a viewer's eye when the video image is displayed on a television or other display screen. The video data is not shown in the drawings so that the features of the present invention can be emphasized.

The first portion 12 including a first preselected pattern of data is arranged at the center of the video frame 18. As the first portion 12 is the portion to be registered with and detected by a correlation detector of a player (not shown) it may be considered to be the correlation kernel of the watermark 10. The correlation detector will always be able to detect it based on its central location and its log-polar coordinates after conversion of its Cartesian coordinates (discussed further below). After the first portion 12 is detected, the player will be able to calculate the necessary geometric information regarding the actual orientation, size, etc., of the first preselected pattern. The player includes memory associated with the correlation detector that stores reference geometric configuration information about the first and second preselected patterns 12 and 14 of the watermark 10. The actual geometric configuration information will be compared to the reference geometric configuration information and any deviation therebetween will then be determined.

In the event that an editing operation, such as rotation or resizing is attempted on a video frame 18 of an associated DVD (not shown), the calculated deviation between the actual and reference geometric configuration of the first portion 12 of the watermark 10 will then be used to calculate the degree of rotation and thus the rotation angle as well as the resizing factor. The rotation angle and resizing factor are then used to precisely locate the rotated and/or resized second portion 14 of the watermark 10 so that the message thereof, such as a "do not copy" message, is conveyed to the player. Thus, unauthorized copying of the video and audio data from the DVD is prevented.

The content of the second portion 14 of the watermark 10 is preferably arranged throughout the associated video frame 18, at portions other than the center thereof where the first portion 12 is arranged. The second portion 14 may have a patterned design consistent with any known watermark, such as the preferred Sony checkerboard watermark, or it may have a new pattern not previously implemented in existing watermarks.

The calculation of any difference between the stored reference orientation of the preselected pattern of the first portion 12 of the watermark 10 and the actual location thereof, may be done by known estimation techniques or by actual measured calculations or algorithms. Thus, as used herein, the term "calculation" is intended to cover both actual and estimated determinations.

Figure 2:
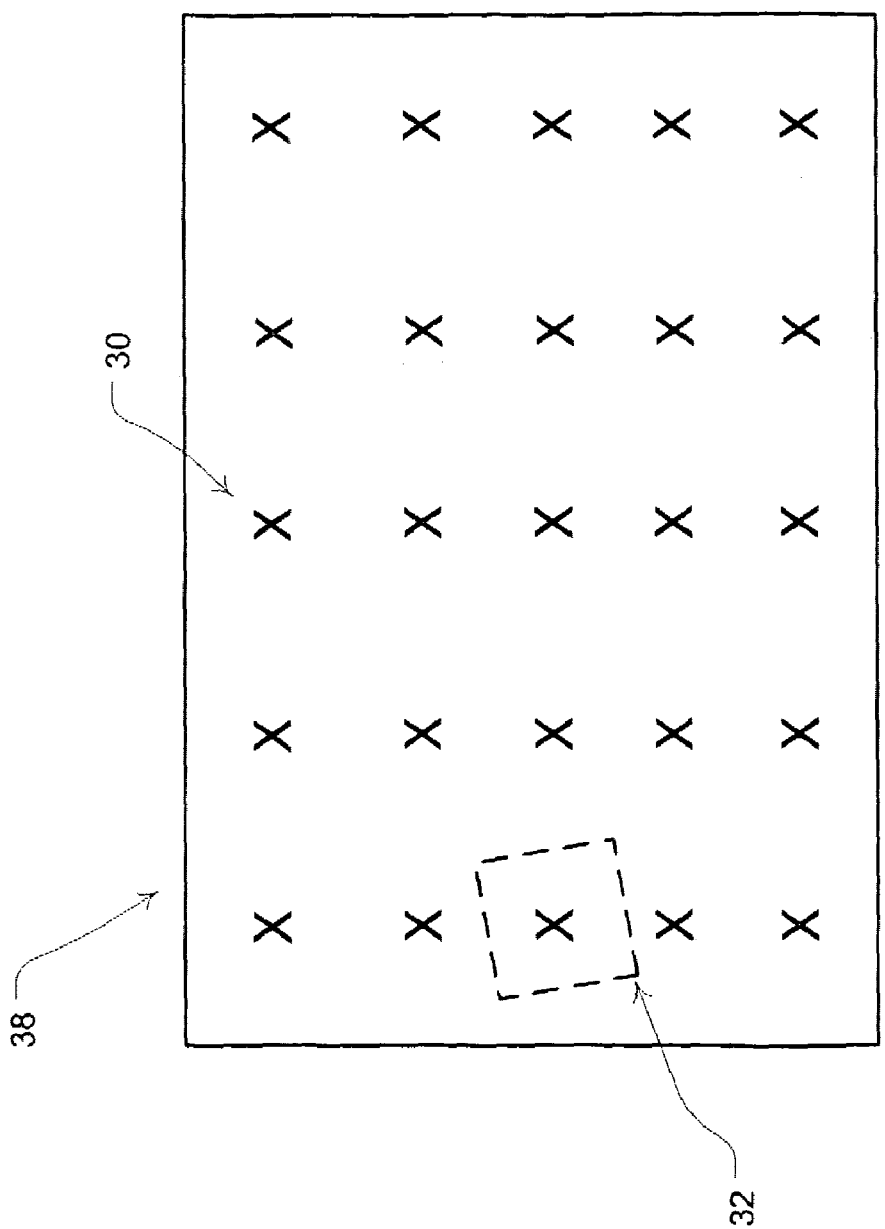
FIG. 2 is a schematic illustration of a frame of data having a prior art watermark embedded therein.

FIG. 2 schematically illustrates a prior art watermark 30 within a frame of video data 38. A correlation kernel 32 that is used for the detection and reading of the watermark is also shown in FIG. 2.

FIG. 3 illustrates a frame of video data 38 having a prior art watermark 30 therein, before and after it is subjected to a rotation operation. As evident from FIG. 3, the correlation kernel 32 of the watermark 30 is rotated along with the video data within frame 38 and the watermark 30 therein. When a correlation detector (not shown) of an associated player looks for the correlation kernel 32, it would only find it along with the message of the hidden watermark 30 in situations where the watermark 30 is not rotated along with the entire video frame 38. However, in a situation where rotation has occurred, the correlation detector of an associated player will not precisely match up with the correlation kernel 32 of the watermark 30. Thus, the hidden message carried by the watermark 30 will not be read by an associated player. A similar problem exists when resizing occurs. That is, the correlation kernel 32 is enlarged such that it does not precisely register with the correlation detector of an associated player. Once again, the message carried by the watermark 10 cannot be read.

The watermark 10 of the present invention is immune to the problem of rotation and resizing, because the centrally arranged first portion 12 will always be detected. The basic reason is that both the design of the pattern and the detector for this pattern use log-polar coordinates.

In order to understand this aspect of the invention, it is helpful to understand the operation of a conventional correlation detector, which may be used to detect the presence of a pattern in an image. This pattern may include a particular arrangement of pixel values over the whole image or a sub-region of the image. One approach would be to search for this pattern in the image. However, if the pattern is used to design a linear filter, it can be detected, even in the presence of noise or interference from details in the image. The pixel values in the pattern are treated as a set of filter coefficients (or kernel) for a linear filter. Then:

1) Superimpose the kernel on a position in an image;
2) Multiply each image pixel by the corresponding coefficient from the kernel (i.e. the value from the pattern to be detected);
3) Sum the collection of products from step 2; and
4) If the sum from step 3 has a large magnitude, then it can be determined that the pattern is present at the particular position. Otherwise, it is not present.

Essentially, the correlation detector strongly reacts to any instance of the pattern in the image, but weakly to anything sufficiently unrelated to that pattern. At a position of an instance of the pattern, the output of the filter is approximately the mean-square energy in the pattern times the sign of the embedded pattern. The energy will vary if the amplitude of the embedded instance of the pattern is different from the amplitude of the pattern in the filter kernel. The sign of the filter output will be negative if the values in the embedded instance were inverted before being added to the image.

In a simple watermark system, a known pattern is added at a known position in an image or video frame, and a correlation detector is used to detect it. The pattern is added at a low level so as to be (almost) invisible. It is chosen to be apparently random or noise-like. This has two benefits: first, if it is visible, it appears as noise; second, the probability of a precisely similar pattern occurring in an image or video frame is extremely small, so the probability of false detection at the output of the correlation detector is also extremely low.

If the position of the watermark pattern in the image or video frame is known, it is only necessary to compute the output of the correlation detector once, for that position. If the pattern has been shifted, then a single instance of the correlation detector, operating at one assumed position, will not find the pattern. Because the watermark pattern has been chosen to be pseudo-random, it exhibits no symmetries under spatial shifts (or, at least, the chance of such symmetries will be extremely low).

To detect the watermark pattern at an arbitrary position in an image frame, the entire image could be filtered with the kernel of the correlation detector, and attempt to detect the pattern at every pixel position in the frame. As the watermark pattern is complex, and the frame may be large, a naive implementation of this would be extremely slow. Nevertheless, the idea is practical because the filtering can be done very fast with fast filtering methods based on fast Fourier transforms.

It would be advantageous to map the images, video frames, and/or watermark patterns to a special domain in which this computation is not required. Also, it would be convenient if the search for a pattern over ranges of rotation and resizing appeared like the search for a watermark pattern with arbitrary spatial position, as described above.

The preferred domain is the log-polar coordinate system. It is a modification of the polar coordinate system. In polar coordinates, a point is represented by its distance R from a fixed central point and an angle θ representing the direction of the vector from the central point to the point in question. Usually, the angle is measured between the vector and a horizontal vector pointing to the right. In the log-polar coordinate system, R is replaced by its logarithm, L=log R. Note that in both coordinate systems, the angle θ dimension is periodic, with period $2\pi$ or 360 degrees.

Consider a point in Cartesian coordinates (x, y), where x and y are its horizontal and vertical offsets from a reference point or origin. Its polar representation can be computed as:

$R=\text{sqrt}(x^2+y^2)$, where $\theta=\arctan(y/x)$

This is then converted to log-polar coordinates by replacing R with L=log R, as mentioned above.

In Cartesian coordinates, given a point (x, y):

Rotation by alpha: (x1, y1)=(x cos alpha−y sin alpha, x sin alpha+y cos alpha)

Resizing by c: (x1, y1)=(cx, cy)

Clearly, a rotation requires trigonometric functions, and neither operation is a shift.

In polar coordinates, (R, θ):

Rotation by alpha: (R1, θ)=(R, θ+alpha)

Resizing by c: (R1, θ)=(cR, θ)

Now the rotation becomes a shift, but resizing is still a multiplication. Since multiplication is equivalent to addition of logarithms, we need only convert R to L=log R to convert resizing to a shift. Therefore, in log-polar coordinates:

Rotation by alpha: (L1, θ1) =(L, θ+alpha)

Resizing by c: (L1, θ1)=(log c+L, θ)

Finally, in log-polar coordinates, resizing becomes a shift by the logarithm of the resizing factor, and any combination of resizing and rotation will become a 2-dimensional shift. Remember that the angle coordinate wraps around with period $2\pi$.

It follows that, if an image or video frame, embedded with the watermark 10, and the central watermark pattern 12 is converted into log-polar coordinates, the central pattern 12 can be found in the frame by implementing a correlation detector that ranges over all 2D shifts in the log-polar domain.

In a digital implementation, the log-polar coordinate space is discrete, with some minimum resolution in each coordinate. The angle coordinate need only have a range of $2\pi$, and the L=logR coordinates is limited by the expected range of resizing factors and the sizes of the image/video frame and or the original size of the central pattern 12. While the conversion from Cartesian to log-polar coordinates is a complex non-linear resampling, the implementation can be simplified by pre-computing and storing the parameters for the re-sampling computation. Furthermore, this mapping is only performed once for each watermarked frame, and the log-polar representation of the central pattern 12 can be precalculated and stored.

Then, for the correlation filtering/detection in the log-polar domain, the same fast algorithms can be used based on fast fourier transforms that were mentioned above (note that a 2D Fourier transform operating on log-polar data is sometimes called a Mellin transform). The correlation detection will find the best-match position of the central watermark 12, from which we can compute the resizing factor and rotation angle.

The information from the log-polar coordinates of the first portion 12 would be used as discussed above to determine any deviation from reference geometric configuration information (also in log-polar coordinates within memory of the player) so that the hidden message of the second portion 14 of the watermark 10 can be readily detected and read.

The present invention also relates to methods of creating a watermark and detecting the watermark on computer readable memory media. In accordance with a preferred algorithm for detecting a watermark, a circular area within the central portion of a video frame 18 is selected. This circular area includes the location of the first portion 12 of the watermark 10 at the center of an associated video frame 18. In the event that the video frame 18 has been subjected to resizing or rotation, prior art watermarks would not be able to be detected as discussed above because the position and/or size of the correlation kernel 32 will not match what is expected by the correlation detector of the player. Such an arrangement is illustrated in FIG. 3, where the watermark 30 and its correlation kernel 32 have been rotated along with video frame 38. In the present method, because the first portion 12 of the present watermark 10 is arranged in the center of the associated video frame 18, the correlation detector of an associated player will always be able to find the general location of the first portion 12. The use of Mellin transforms and log-polar coordinates will then enable an associated correlation detector to register with the pattern of the first portion 12 and process the image thereof.

The radius of the selected circular area should be sufficiently enlarged to include the central log-polar pattern, even if the pattern is resized up to some maximum value. The extent of the central log-polar pattern of the first portion 12 of the watermark 10 should be selected according to the likely maximum resizing factor to be selected by the system designer. The preselected pattern of the first portion 12 of the watermark should then be converted to be recognized in log-polar coordinates.

Reference information about the geometric configuration of the first portion 12 of the watermark is stored in the memory associated with the correlation detector of a player as discussed above. This reference geometric configuration information is preferably stored in log-polar coordinate information. The stored log-polar reference information is then correlated with the actual geometric configuration information that has also been converted to log-polar coordinates. All possible shifts are considered. The correlation between actual and stored log-polar coordinates is a known technique. There are various ways to accomplish such correlation with or related to fast Fourier transforms. After the mathematical calculation relating to correlation of the stored and actual log-polar coordinates has been completed, the maximum output value should be determined along with its location. Such location will have two coordinates—one "angle" coordinate and "logarithm of radius" coordinate. This is the location where the stored central pattern best matches the corresponding patterns in the log-polar converted image area.

Such information relates to the deviation between the actual and stored log-polar coordinate information of the central portion 12 of the watermark 10.

Given the foregoing information, and the known reference size and orientation angle of the stored reference information, simple arithmetic can be used to compute the resizing factor and rotation angle that the data within the video frame 18 has undergone. This information is then used by the associated correlation detector of a player to detect and read the hidden message carried by the second portion 14 of the watermark 10.

The watermark 10 is preferably substantially hidden from view when the video data is displayed on an associated display screen. This will ensure that the watermark 10 does not interfere with the enjoyment of the movie or other video data. Although the present invention has been described herein with reference to video data, it should be appreciated that the present two part watermark and method of detecting an embedding scene may be utilized for various other applications, such as for use in audio, still image, text or other data.

The present invention is advantageous in that it provides a low cost solution to protect content on computer readable memory media from copying by pirates. The present invention is intended to be implemented with existing MPEG standards, but it should be understood that it can be modified for use with any image/video format or codec. The present invention can be used as a detection system in both analog and digital domains, and is effective in preventing copying of content on memory media from both consumer and professional equipment. For example, in order to detect the present watermark, one or more frames are typically converted into digital form and are then digitally processed. The associated correlation detector can then be used to control the analog output.

While the foregoing detailed description describes a preferred product and methods of detecting and embedding a watermark on a memory medium, it should be appreciated that the invention is defined by the claims set forth below and is not intended to be limited to the preferred embodiments. Accordingly, those skilled in the art are encouraged to modify the preferred features and steps described herein while remaining with the scope of the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of creating a hidden watermark message within video or audio data on a computer readable memory medium, said method comprising providing video or audio data arranged on the computer readable memory medium in a plurality of frames, and a hidden watermark arranged in at least one of said plurality of frames, said watermark including a first preselected pattern of data of a spatial domain and a second preselected pattern of data, said first preselected pattern including information from which the geometric configuration of said second preselected pattern of data and said video or audio data within maid frames can be determined, said second preselected pattern of data including information indicative of a desired message, said first and second preselected patterns of data being substantially bidden when said video or audio data is displayed or played on a display screen or player.

2. The method of claim 1, wherein said first preselected pattern of data is arranged at a central portion of said at least one frame.

3. The method of claim 1, wherein said second preselected pattern of data is arranged at portions other than said central portion of said at least one frame.

4. The method of claim 1, further comprising an optical medium.

5. The method of claim 4, further comprising a DVD.

6. The method of claim 4, wherein said first preselected pattern of data is arranged at a central portion of said at least one frame.

7. The method of claim 1, wherein said desired message of said second preselected pattern of data comprises a do not copy message.

8. The method of claim 1, wherein said first preselected pattern of data comprises a design having portions suitable to be converted into log polar coordinates.

9. The method of claim 1, wherein said information from said first preselected pattern of data comprises position and size information such that the relative position and size of said second preselected pattern of data and said video or audio data can be determined.

10. A method of creating a hidden watermark message within video or audio data on an optical medium, said method comprising providing an optical medium comprising digital video data arranged in a plurality of video frames, and a hidden digital watermark arranged in at least one of said plurality of video frames, said hidden digital watermark including a first preselected pattern of digital data arranged at a central portion in a spatial domain of at least one of said frames, and a second preselected pattern of digital data arranged within said at least one of said frames, said first preselected pattern including information from which the geometric configuration of said second preselected pattern of digital data and said video data within said frames can be determined, said second preselected pattern of digital data including information indicative of a desired message, said first and second preselected patterns of digital data being substantially hidden from view when the digital video data is displayed on a display screen.

11. The method of claim 10, wherein said information from said first preselected pattern of digital data comprises position and size information such that the relative position and size of said second preselected pattern of digital data and said video data can be determined.

12. The method of claim 10, wherein said second preselected pattern of digital data is arranged on the optical medium at portions other than said central portion of said video frames.

13. The method of claim 10, wherein said desired message of said second preselected pattern of digital data comprises a do not copy message.

14. The method of claim 10, wherein said desired message of said second preselected pattern of digital data is arranged within a plurality of said video frames.

15. The method of claim 10, wherein said first preselected pattern of digital data comprises a design having portions suitable to be converted into log-polar coordinates.

16. A method of creating a hidden watermark message within video or audio data on a computer readable memory medium, the data being in a plurality of frames, said method comprising the steps of:

embedding a first preselected pattern of data within a spatial domain of at least one frame of data on said computer readable memory; and embedding a second preselected pattern of data within said at least one frame of data on said memory medium, said first preselected pattern of data including information from which the geometric configuration of said second preselected pattern of data and said video or audio data within said at least one frame of data can be detected, said second preselected pattern including information indicative of a desired message, said first and second preselected patterns being substantially hidden when the video or audio data is displayed or played.

17. The method of claim 16, wherein said first preselected pattern of data is embedded on said memory medium at a central portion of said at least one frame.

18. The method of claim 17, wherein said second preselected pattern of data is embedded on said memory medium at portions other than said central portion of said at least one frame.

19. The method of claim 16, wherein said desired message of said second preselected pattern of data comprises a do not copy message.

20. The method of claim 16, wherein said desired message of said second preselected pattern of data is arranged within a plurality of said frames.

21. The method of claim 16, wherein said first preselected pattern of data comprises a design suitable to be converted into log-polar coordinates.

22. The method of claim 21, wherein the first preselected pattern of data is generally circular and asymmetric.

23. The computer readable memory medium of claim 1, wherein the first preselected pattern of data is generally circular and asymmetric.

24. The optical medium of claim 11, wherein the first preselected pattern of data is generally circular and not completely symmetric.

* * * * *

UNITED STATES PATENT AND TRADEMARK OFFICE
CERTIFICATE OF CORRECTION

PATENT NO. : 6,985,601 B2
DATED : January 10, 2006
INVENTOR(S) : Peter D. Wendt

It is certified that error appears in the above-identified patent and that said Letters Patent is hereby corrected as shown below:

<u>Column 12,</u>
Line 17, "maid" should read -- said --;
Lines 20-21, "bidden" should read -- hidden --.

Signed and Sealed this

Ninth Day of May, 2006

JON W. DUDAS
*Director of the United States Patent and Trademark Office*